Nov. 10, 1942.   J. ZALKIND   2,301,605
MACHINE FOR PINNING RECORD FORMS IN SHINGLED FORMATION
Filed Jan. 30, 1941   11 Sheets-Sheet 1
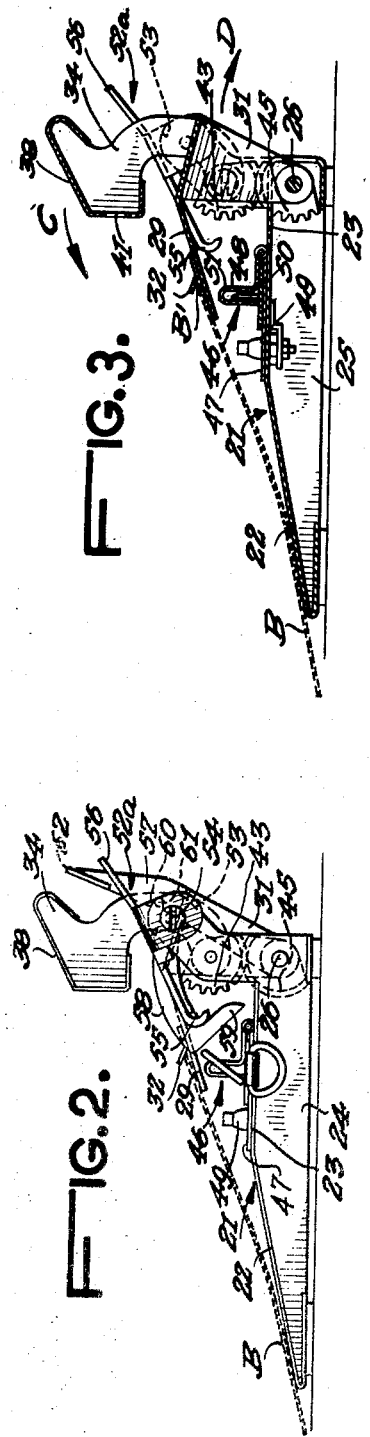
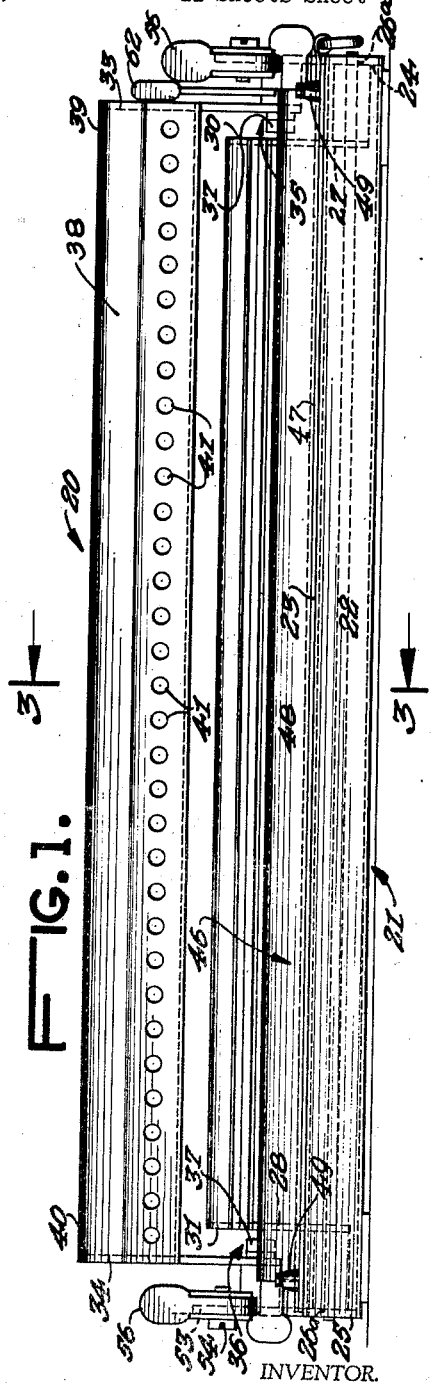
INVENTOR.
Joseph Zalkind Nov. 10, 1942.       J. ZALKIND       2,301,605
MACHINE FOR PINNING RECORD FORMS IN SHINGLED FORMATION
Filed Jan. 30, 1941       11 Sheets-Sheet 2
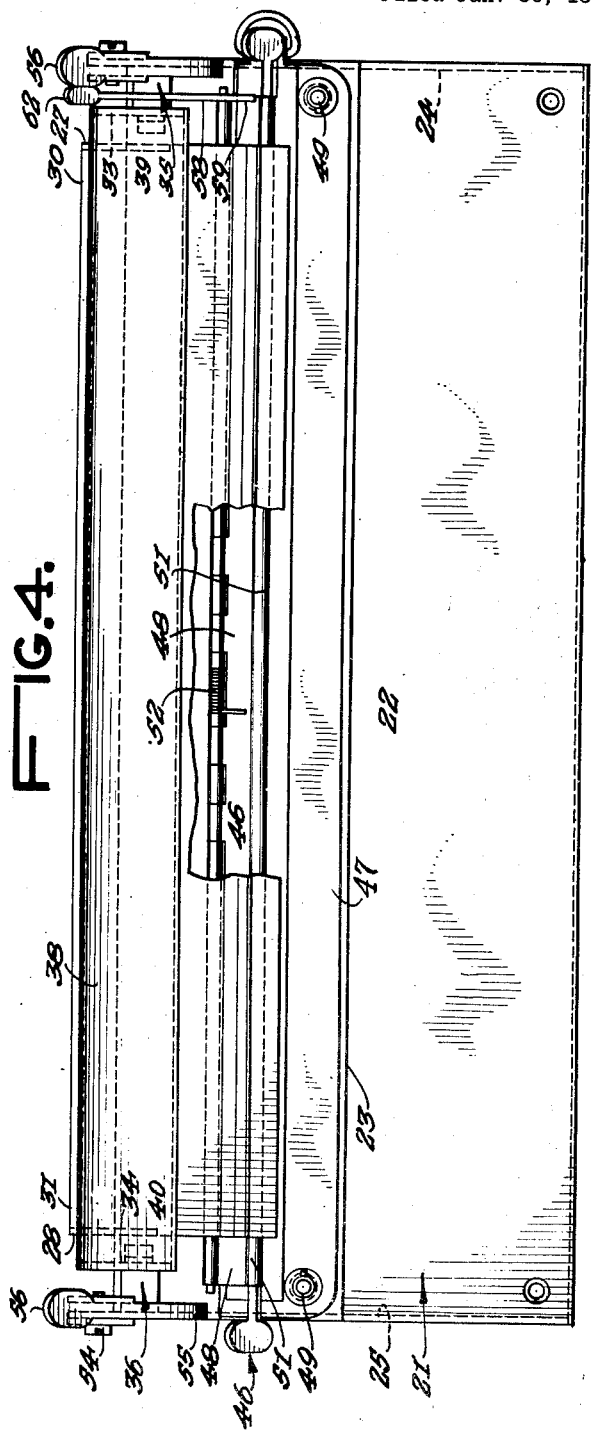
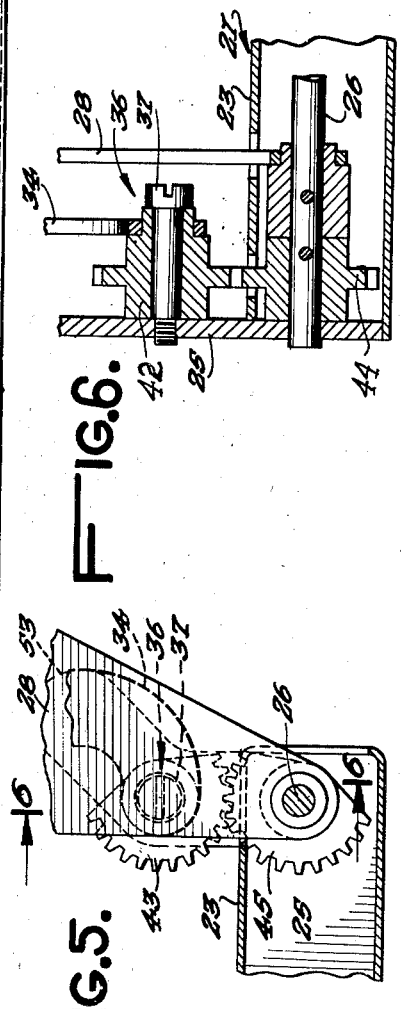
INVENTOR.
Joseph Zalkind Nov. 10, 1942.  J. ZALKIND  2,301,605
MACHINE FOR PINNING RECORD FORMS IN SHINGLED FORMATION
Filed Jan. 30, 1941  11 Sheets-Sheet 3
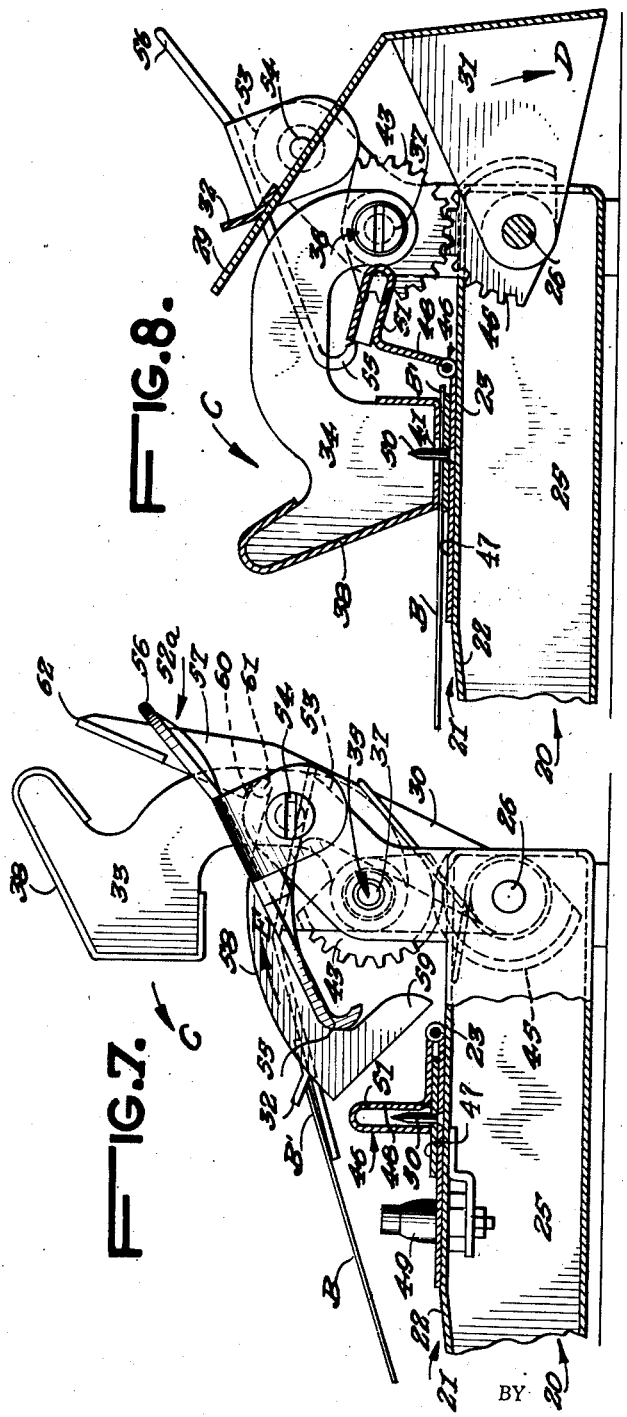
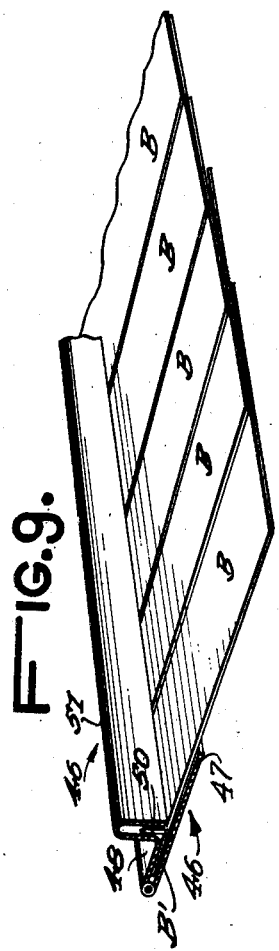
INVENTOR.
Joseph Zalkind
BY

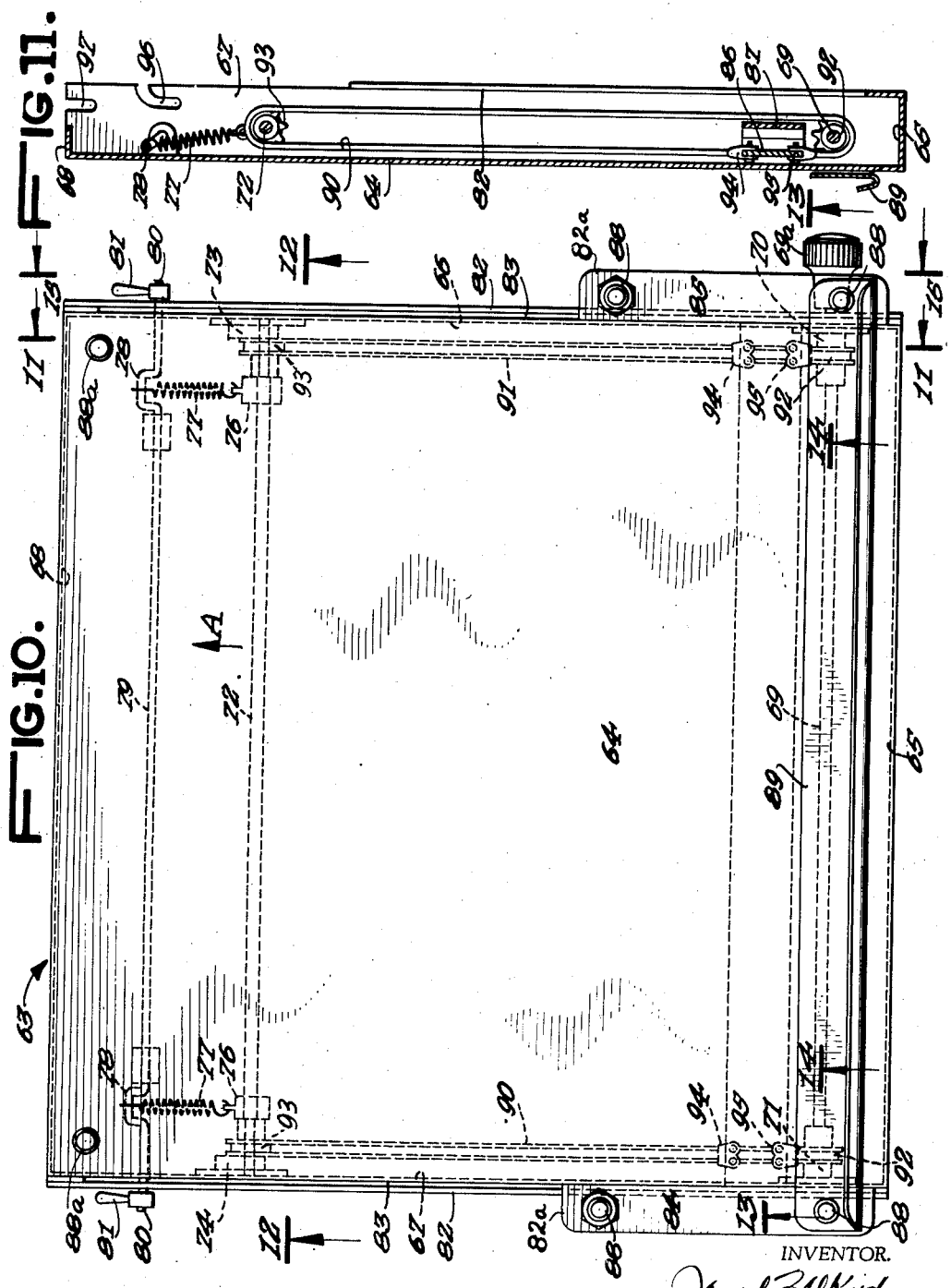

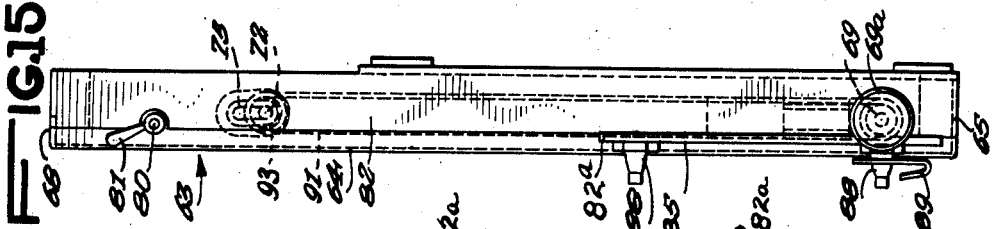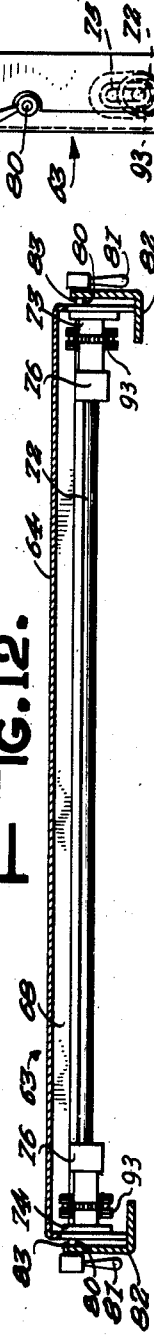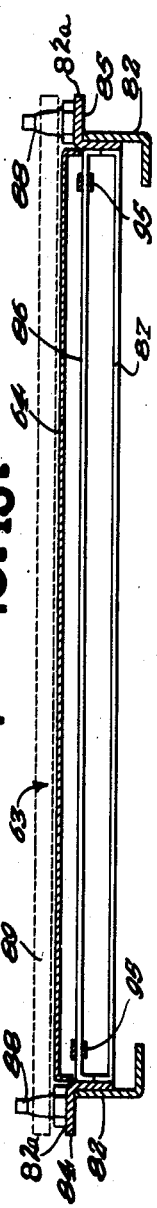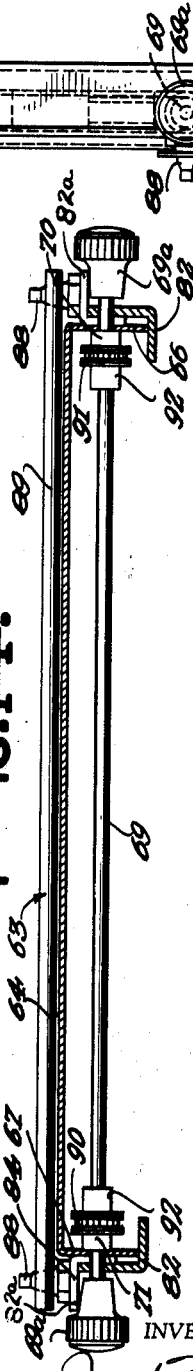

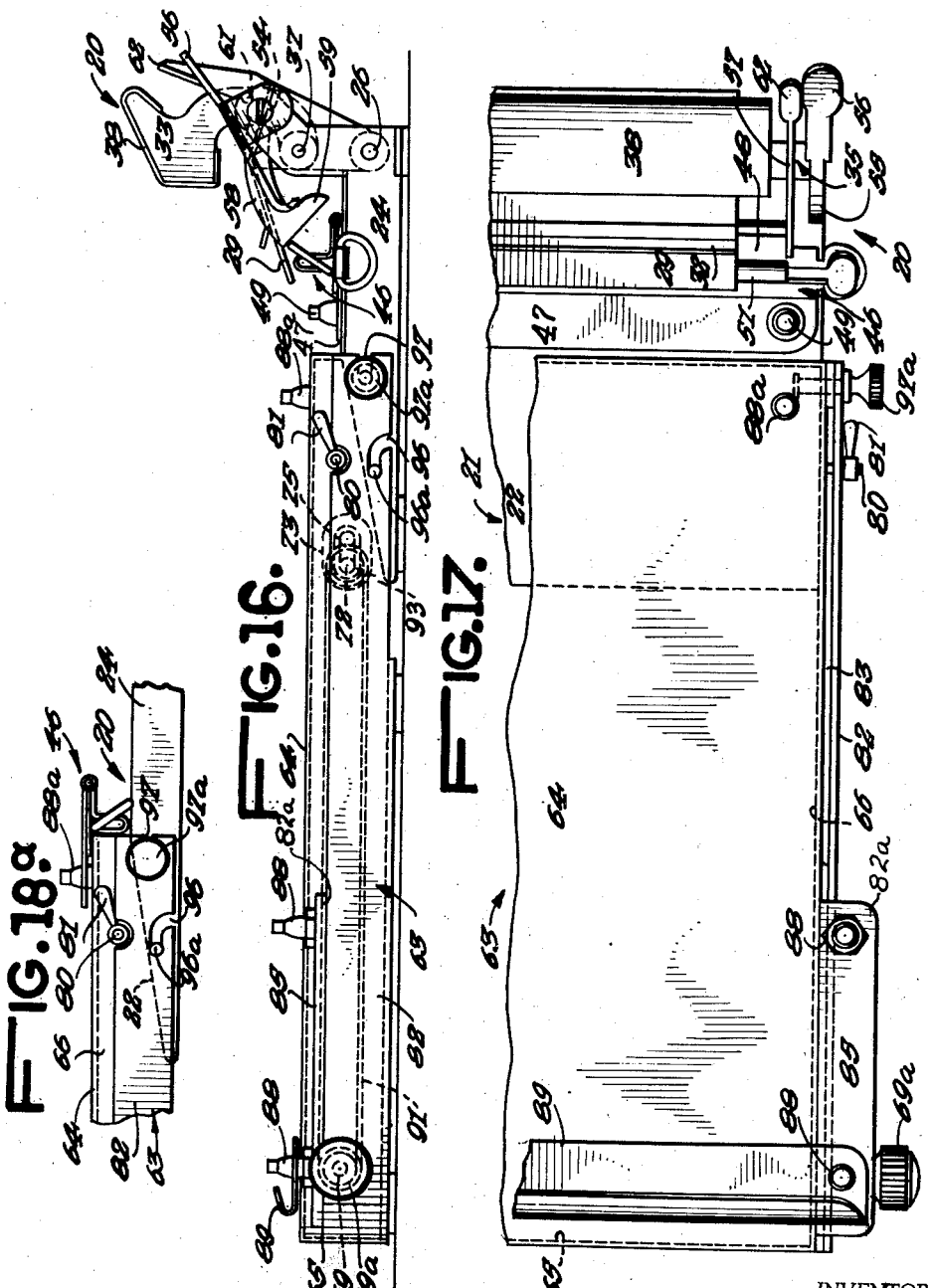

Nov. 10, 1942.  J. ZALKIND  2,301,605
MACHINE FOR PINNING RECORD FORMS IN SHINGLED FORMATION
Filed Jan. 30, 1941  11 Sheets-Sheet 7
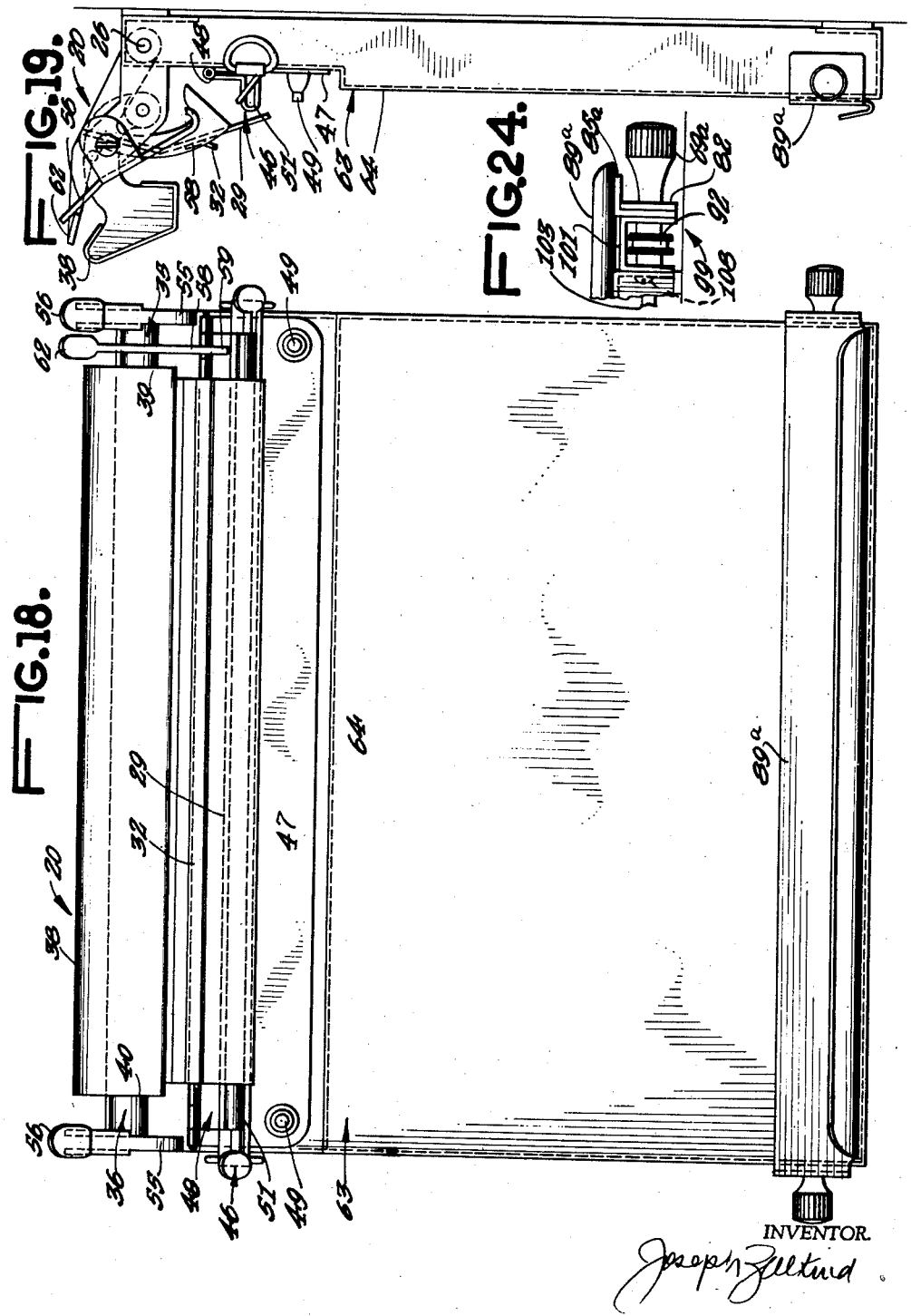
INVENTOR.
Joseph Zalkind

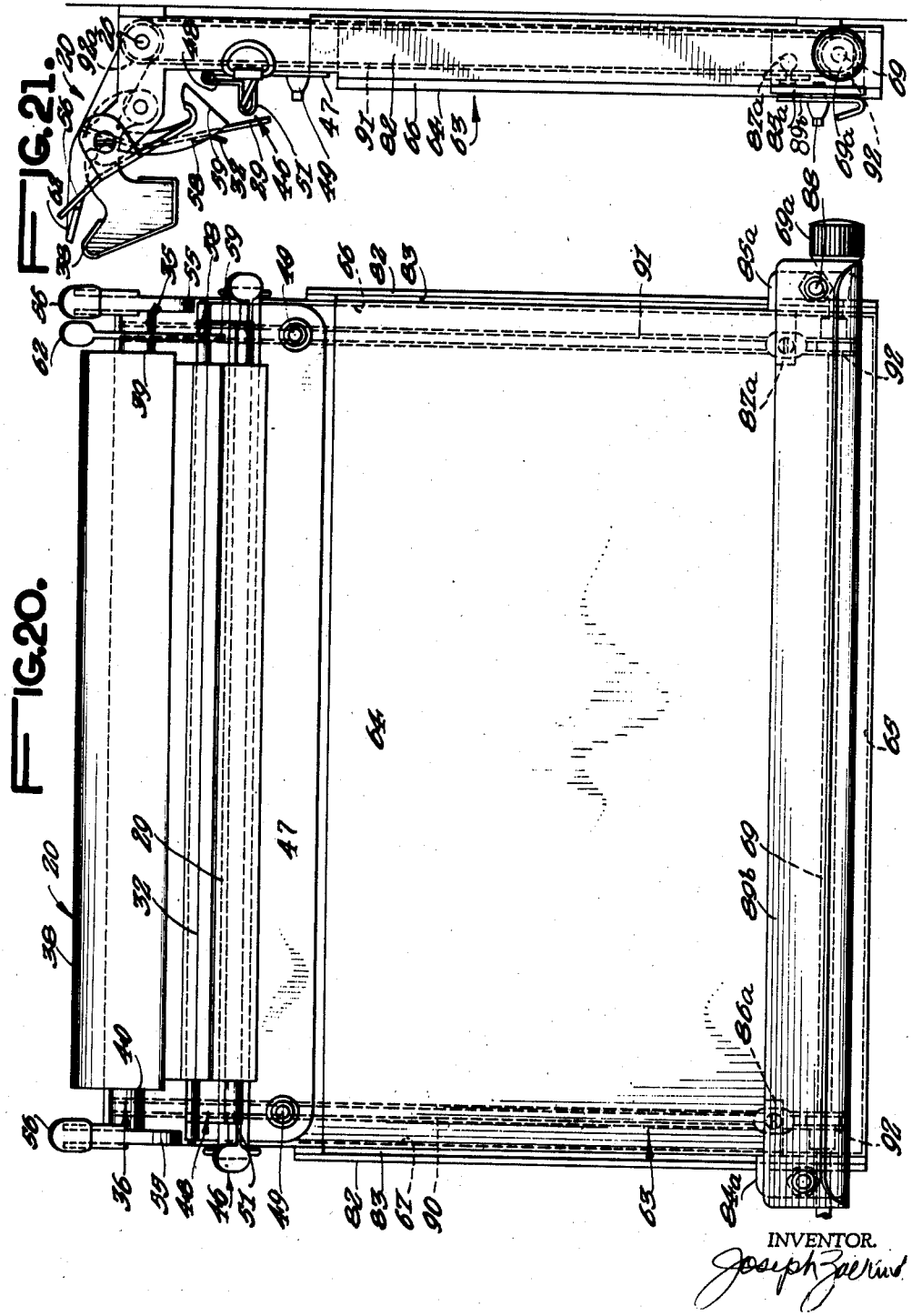

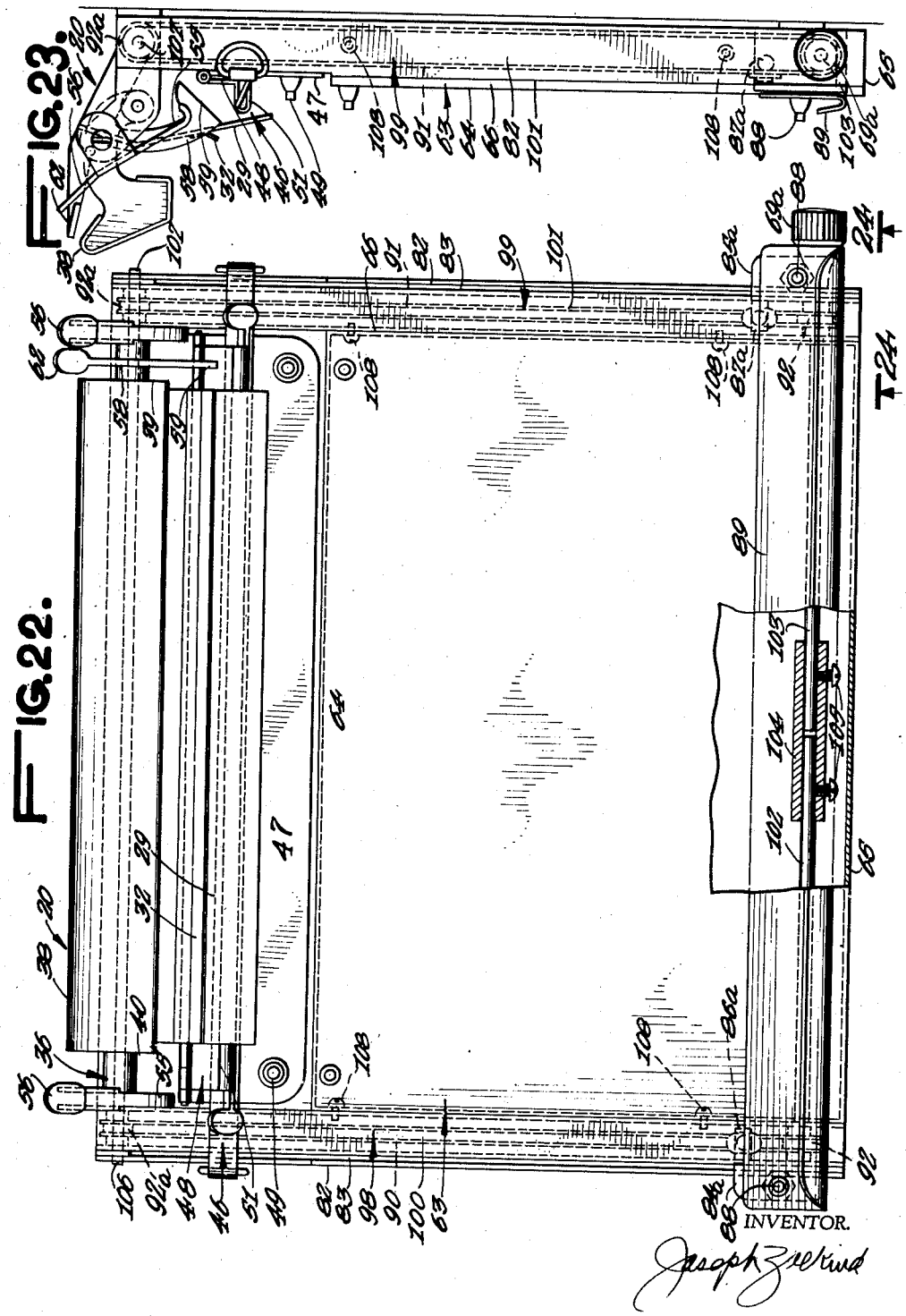

Nov. 10, 1942.  J. ZALKIND  2,301,605
MACHINE FOR PINNING RECORD FORMS IN SHINGLED FORMATION
Filed Jan. 30, 1941  11 Sheets-Sheet 10
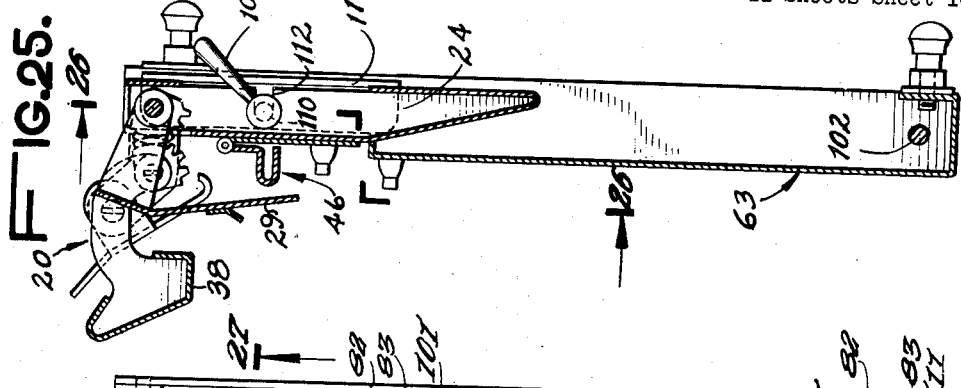
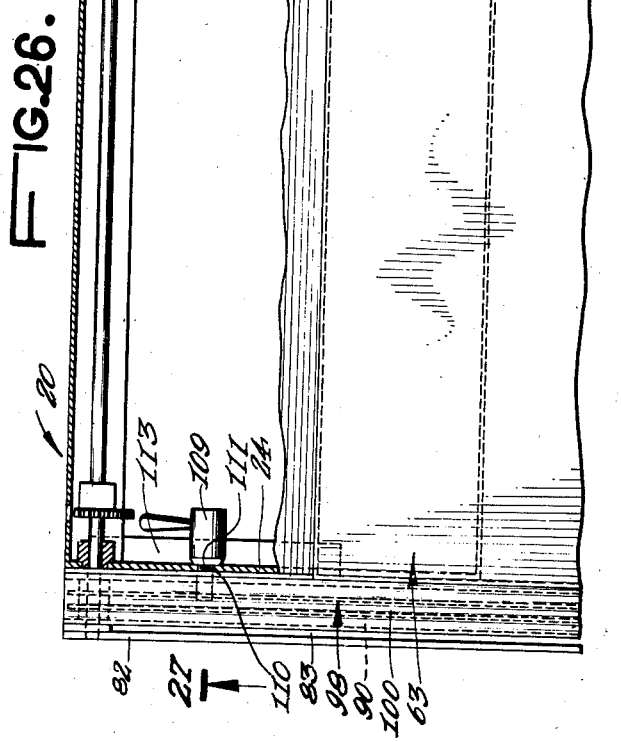
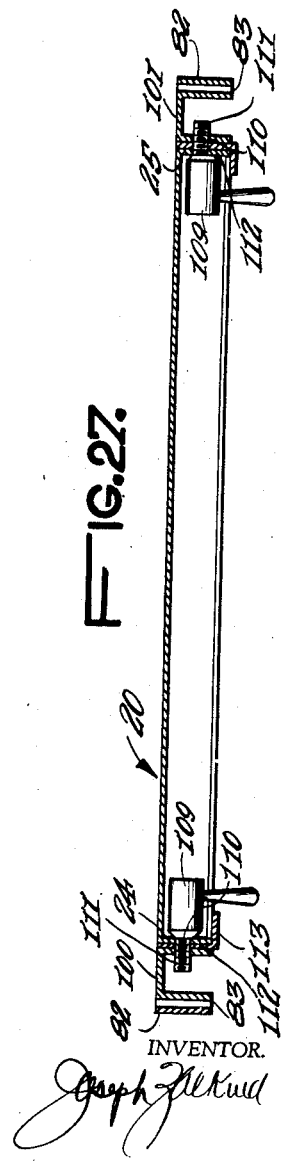
INVENTOR.
Joseph Zalkind

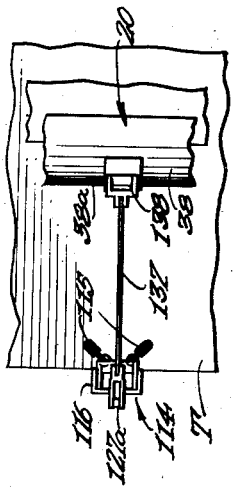
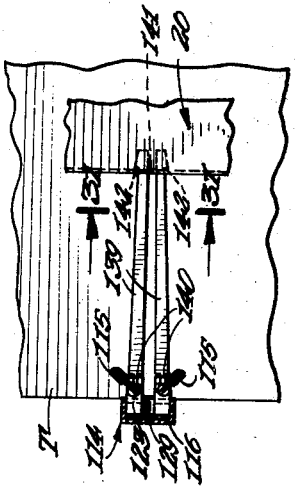
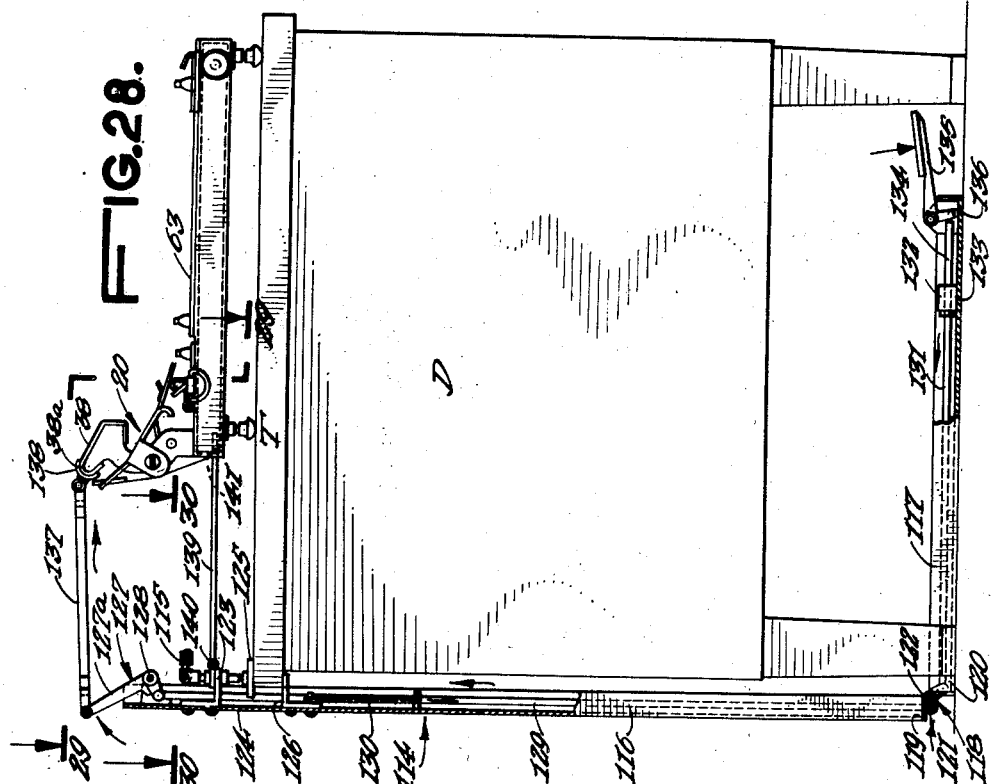

Patented Nov. 10, 1942

2,301,605

UNITED STATES PATENT OFFICE 2,301,605

MACHINE FOR PINNING RECORD FORMS IN SHINGLED FORMATION

Joseph Zalkind, New York, N. Y.

Application January 30, 1941, Serial No. 376,631

12 Claims. (Cl. 129—4)

This invention relates to devices for attaching and holding upon a pinstrip, sheets of papers such as bills, receipts, etc. and particularly to devices used to facilitate the summary and computation of data contained in a series of records or forms. These records or forms have rows arranged vertically in columnar form for placing therein the quantity, price, etc. of items sold or brought when it is desired to tabulate the total value or number of any particular item sold and recorded upon such forms.

One object of this invention is to provide a device that can be operated manually and with the maximum of safety.

Another object of this device is to provide a device that is simple to manufacture and easy to operate.

A further object of this device is to provide means for the fastening of sheets of paper such as bills or receipts, etc. in a shingled formation and arranged in series and in horizontal or vertical position.

Another object of this device is to provide a device which will have a set of upright pins located thereon arranged in series and means for facilitating the pinning of sheets of paper upon said pins.

A further object of this invention is to provide safety shutter means upon said device which will cover said pins when the device is not in operation.

A further object of this invention is to provide means for facilitating the pinning or pegging of sheets of paper upon said pins.

A further object of this invention is to provide novel gear means for facilitating the operation of said safety shutter and said pinning means simultaneously and in timed relation to each other.

Still a further object of this invention is to have said safety shutter means and pinning means arranged in such a manner that when the pinning means is inoperative, the shutter means will cover said pins and stay in that position until the pinning means is again operated.

A further object of this invention is to provide locking means for locking the shutter means in position, when resetting the pinstrip.

A further object of this invention is to provide a summary or aligning board to be used in conjunction with said pinning device.

A further object of this invention is to provide means upon said summary board to facilitate adjustment for different sizes of bills.

A further object of this invention is to provide an aligning board in conjunction with a bill sheet pinning device that will be easy and safe to operate and inexpensive to manufacture.

A further object of this invention is to provide an aligning or line-up table built in direct combination with a bill sheet pinning device.

Still a further object of this invention is to provide a line-up table built in combination with a bill sheet pinning device and to provide means thereon to facilitate aligning adjustment for different sizes of bills.

A still further object of this invention is to provide a line-up table built in combination with a bill sheet pinning device and to provide means thereon to facilitate the attachment thereto of a chain aligning device.

Further objects will be apparent as the description of the device will proceed.

Referring to figures:

Fig. 1 is a front view of the pinning device.

Fig. 2 is a side view of the pinning device.

Fig. 3 is a section through the device taken on the line 3—3 of Fig. 1.

Fig. 4 is a top view of the pinning device shown partially broken away to disclose the pinstrip bar.

Fig. 5 is a partial section view showing in detail the arrangement of the gear segments for operating the device.

Fig. 6 is a section taken on the line 6—6 of Fig. 5.

Fig. 7 is an enlarged view of the device, similar to the one shown in Fig. 2, partially in section. This view illustrates the location of parts when the device is in an inoperative position.

Fig. 8 is a sectional view, similar to the one shown in Fig. 7, showing the location of the parts when the device is in operative position.

Fig. 9 is a perspective view of the pinstrip bar showing a number of sheets of paper such as bills or the like attached to it.

Fig. 10 is a top view of the removable summary or aligning board used in conjunction with the pinning device.

Fig. 11 is a section through the aligning board taken on the line 11—11 of Fig. 10.

Fig. 12 is a section taken on the line 12—12 of Fig. 10.

Fig. 13 is a section taken on the line 13—13 of Fig. 10.

Fig. 14 is a section taken on the line 14—14 of Fig. 10.

Fig. 15 is a section taken on the line 15—15 of Fig. 10.

Fig. 16 is a side view showing the manner in which the aligning board is attached to the pinning device.

Fig. 17 is a top view of Fig. 16.

Fig. 18 is a plan view showing a line-up or aligning board built in combination with a bill sheet pinning device.

Fig. 18a is a partial view showing the manner the pinstrip bar of Fig. 9 is attached to the aligning board in upside position.

Fig. 19 is a side view of the line-up table or board shown in Fig. 18.

Fig. 20 is a plan view of an aligning device similar to the one shown in Fig. 18, but also having means thereon to facilitate for adjustment for different sizes of bills.

Fig. 21 is a side view of the line-up table or aligning board shown in Fig. 20.

Fig. 22 is showing a line-up table in combination with a bill pinning device. It also shows the arrangement for attaching thereto of a chain aligning device.

Fig. 23 is a side view of the line-up table shown in Fig. 22.

Fig. 24 is a partial front view on the line 24—24 of Fig. 22.

Fig. 25 is a sectional side view showing a somewhat modified arrangement for attaching the pinning device proper to the line-up or aligning board.

Fig. 26 is a section taken on the line 26—26 of Fig. 25 showing the manner the pinning device is attached to the aligning board. It also shows the shelving supports and the brackets for tightening the pinning device to the board.

Fig. 27 is a section taken on the line 27—27 of Fig. 26.

Fig. 28 is a view showing a foot pedal for operating the pinning device and the manner it is attached to a desk or table.

Fig. 29 is a plan section on the line 29—29 of Fig. 28 showing the link for operating the device.

Fig. 30 is a section taken on the line 30—30 of Fig. 28 showing the manner the pinning device is connected to the foot pedal and held in place upon the desk top.

Fig. 31 is a section on the line 31—31 of Fig. 30.

Specification

Referring to Fig. 1, 20 is the pinning device proper. The device 20 consists of a base 21 and comprises a tapered portion 22 and a horizontal portion 23. A pair of side frames 24 and 25 are attached to each side of the base 21, a shaft 26 (see Figs. 2 and 3) is held in bearings 26a which are located in the side frames 24 and 25. A pair of hinging segment shaped plates 27 and 28 are attached to both ends of the shaft 26. The segment plates 27 and 28 are attached to both ends 30 and 31 of the shield or shutter plate 29. An elongated angle bar 32 is fastened to the shield 29 as shown in Figs. 2, 3, 7 and 8. A pair of hingeably mounted U-shaped frames 33 and 34 are hingeably attached to the side frames 24 and 25 as 35 and 36 by screws 37. The elongated angle bar 32 is used to align the bill sheets B upon the base 21. For this purpose the top margins of the bill sheet is placed so as to contact the elongated angle bar 32 while the sheet is held upon the base 21 by hand. The elongated pin bar or pressure bar 38 is attached at both ends 39 and 40 to the hingeably mounted frames 33 and 34. A number of openings 41 are located lengthwise upon the bar 38. A pair of gear segments 42 and 43 are attached to the lower portion of each of the side frames 33 and 34 respectively. The gear segments 42 and 43 are in mesh with another pair of gear segments 44 and 45 which are attached to both ends of the shaft 26. A pinstrip bar or holder 46, which comprises an elongated flat plate 47 and an L-shaped bar 48, is removably attached to the device proper upon the locating studs 49. The locating studs 49 are attached to both ends of the base 21 (see Fig. 4). The flat plate 47 of the pinstrip 46 carries a number of upright pins 50. The L-shaped bar 48 has an inverted U-shaped portion 51 which is so arranged as to cover the pins 50, while a number of coil springs 52 (see Fig. 4) hold the L-shaped hinging bar 48 under tension in the position as shown in Figs. 2 and 3. The operation of the pinstrip holder 46 will be described herewith.

A pair of holder members 52a are hingedly attached to the extensions 53 on both side frames 24 and 25 by the screws 54. The holder members 52a are formed at one end into hook-like portions 55 to facilitate the holding in place of the L-shaped hinging bar 46 when the L-shaped bar 48 is in upright open position as shown in Fig. 8. The opposite ends 56 of the members 52a are used by the operator when it is required to release the L-shaped hinging bar 48. To that purpose they are depressed by the operator simultaneously at both ends of the pinning device.

To facilitate the locking in position of the pin bar 38, an arm 57 is hingedly attached to the shaft 26. A curved extension 58 of the arm 57 has a downwardly extending member 59 which engages the L-shaped bar 48 when said bar is hinged into the upright or open position as shown in Fig. 8. The arm 57 has a groove 60 which engages a pin 61. The extending member 59 is flat upon its left side and will contact the L-shaped bar 48 when said bar will be hinged in the position shown in Fig. 8. Being that Fig. 8 is a sectional view and Fig. 7 an outside side view of the device the curved extension 58 and the arm 57 have been omitted in Fig. 8. The operation of the L-shaped bar 48 upon the extending member 59 will facilitate the hinging of the arm 57 to release the bar 38. The bar 38 is held normally in operative position due to the locking action of the pin 61 which is located upon the side frame 33 of the bar 38 and rides or engages the groove 60 of the arm 57. The operation of hinging the arm 57 by the bar 48 disengages pin 61 from the groove 60 and releases the bar 38 for operation by the attendant. The pin 61 is located upon the side frame 33 and engages the groove 60 of the arm 57 when the device is not operated. A finger tip 62 is located on the arm 57. The finger tip 62 is used when it is desired to disengage the arm 57 from the pin 61 when operating the device.

Referring to the summary or aligning board 63 shown in the Figs. 10 to 15 it consists of a flat table top 64 which has four downwardly extending sides 65, 66, 67 and 68. An operating shaft 69 turns into bearing bushings 70 and 71 which are attached to the sides 66 and 67 of the table top 64. A secondary shaft 72 is made to rotate into bearing members 73 and 74 which are also attached to the sides 66 and 67 of the table top 64. The bearing members 73 and 74 have elongated openings 75 so that while the secondary shaft 72 is able to rotate it can also be slid in the direction indicated by the arrow A. A pair of bushings 76 are located over the shaft 72 and are attached to the tension springs 77 which are in turn attached to U-shaped portions 78 of the tension shaft 79. Both ends 80 of the shaft 79 extend beyond the sides 66 and 67 of the table top 64 and are attached to the handles 81. The operation of the tension shaft 79 will be described hereinafter.

A pair of L-shaped guide members 82 are attached to the sides 66 and 67 of the table top 64 in such a manner as to provide a slot or opening 83 between said sides 66 and 67 and the L-shaped member 82. Within both of the slots 83 there is located a pair of angle-shaped members 84 and 85 which are connected to each other through connecting bar 86 and 87. Upon the upper portion 82a of the angle members 84 and 85 there are attached a set of studs 88 which serve to receive and hold in position an aligning ruler or bar 89. The chains 90 and 91 for sliding the aligning ruler 89 are placed over sprockets 92 which are attached to the operating shaft 69 and over the sprockets 93 which are attached over the secondary shaft 72. The ends 94 and 95 of the chains 90 and 91 are attached to the connecting bars 86 and 87. Both sides 66 and 67 of the table top 64 have an L-shaped slot 96 and an elongated slotted 97. The utility of the slots 96 and 97 will be described hereinafter. Numerals 98 and 99 designate the position of the chains 100 and 101, one chain 100 located on the left side of the pinning device and the other chain 101 being located on the right side of the device.

Referring to Fig. 18 it is showing a combination of an aligning board or line-up table similar to one 63 shown in Figs. 10, 11 and 17 with the sole difference that it is directly attached to the bill pinning device 20 shown in Figs. 1, 2 and 3 instead of being removable. Referring the aligning board 64 shown in Figs. 10, 11, 16 and 17 the slot 96 is placed over a pin 96a (one of each attached to the right frame 24 and left frame 25 of the pinning device 20) to facilitate the conjoining of the aligning board 64 to the frames 24 and 25 of the pinning device or holder 20. The other slot 97 is shoved under the thumbnut 97a which is made tight to hold the board 64 to the pinning holder 20. When it is desired to disconnect the aligning board 64 from the holder 20, the thumbnut 97a is loosened and the board 64 is detached from the holder by sliding it off the pins 96a.

Note that the aligning board 63 as shown in Figs. 10, 11, 16 and 17 has a pair of L-shaped slots 96 on either one of its sides 82. It also has a pair of elongated slots 97. These L-shaped and elongated slots allow for the removal of the aligning table 63 from the pinning device 20. In the case of Figs. 18 and 19 the aligning board 63 is built into the bill pinning device 20 and comprises one unit instead of two. The aligning ruler 89a is in this case operated manually by pushing directly upon it.

In the case of the aligning board as shown in Figs. 20 and 21 the aligning ruler 89b is operated through chains 90 and 91 and knobs 69a similar to the ones shown in Figs. 10, 11 and 17. Here also the aligning board 63 and the bill pinning device 20 are built into one device and are not removable. The chains 90 and 91 are not attached to the connecting bars 86 and 87 as shown in Figs. 10 and 11 but to a pair of studs 86a and 87a attached to the angle shaped members 84a and 85a on each side 82 of the aligning board 63. The chains 90 and 91 run over sprocket wheels 92 and 93.

An important feature of this invention is that it allows an operator of the device in an easy and simple way to disconnect the aligning board 63 from the pinning device 20 and it makes possible the sale and distribution of the pinning device in combination with an aligning board or separately.

In certain cases it is necessary to operate the pinning device 20 by foot as to allow the operator the free use of hands. To this purpose a foot pedal operated device 114 (see Fig. 28) is attached to a desk or table D through a pair of knurled tightening thumb nuts 115. The device 114 consists of a pair of U-shaped channel members 116 and 117. A hinge 118 is attached to the end 119 of the channel 116 and to the end 120 of the channel 117 while a double fulcrum arm 121 is hingedly secured upon the pin 122 of the hinge 118. The thumb screws 115 are threaded into an angle member 123 that is secured to the upper end 124 of the channel 114. The lower part of the screws 115 is held in a flat plate 125, while a secondary angle member 126 is attached to the upper end 124 of the channel 114 and below the angle member 123. To attach the foot pedal device to the top T of the desk D, the angle member 126 is shoved under the top T of the desk D and then the plate 125 is clamped tight above the top T.

Another double fulcrum arm 127 is hingedly attached at 128. The fulcrum arm 127 is connected to the fulcrum arm 121 by a connecting link 129, which is under the tension of the spring 130, and to a link 132 which is made to slide in a bearing 132. The bearing 132 is attached to the channel 117 at 133 and the end 134 of the link 131 contacts the pedal 135 at 136. To operate the pinning device 20, the long extension 127a of the double fulcrum arm 127 is attached to a link 137 which in turn contacts the edge 38a of the bar 38 through a pivotally mounted bracket 138. A pair of shelves 113 are attached to either side of the base 63 (see Fig. 26) to help support the pinning device 20 when it is attached to the base 63 through the screws 109 having a threaded portion 110 fitted into an opening 111 of the shelf 113.

As it is important to have the pinning device 20 and the foot pedal device 114 attached in correct relation to each other, a pair of holding arms 139 is used as spacer links between the device 20 and the pedal device 114. The holding arms 139 are hingeably secured to the channel 116 at 140. When it is required to have the pinning device operated by the foot pedal device, the arms 139 are inserted into an opening 141 located at the rear of the pinning device 20. The arms 139 and into hook like portions 142 which engage the edges 141a of the opening 141 and thus hold the device 20 in place until removed from the foot pedal device by the operator. The lower end 119 of the channel 116 has an opening to allow the passage of the rod 129. The end 134 of the push rod 131 contacts the fulcrum 136 that is operated by the footpedal 135. The arms 139 have cutouts 142 of L-shaped formation to hook within the slot 141 (see Figs. 30 and 31).

When the device 114 is removed from the desk D, it is collapsed together by hinging the channels 116 and 117 upon the hinge 118. The link 137, arm 139 and foot pedal 135 are hinged around and placed within the confines provided by the sides of the channel 116 and 117. The foot pedal device 114 operates the pinning device 20 when the operator depresses the foot pedal 135.

*Operation*

When it is required to operate the device, the pinstrip holder 46 is placed upon the horizontal portion 23 of the device 21 and is attached to the studs 49, the L-shaped bar 48 is then hinged rearwardly as shown in Fig. 8 and is held in position by the hooked holding members 52a. In this position the pins 50 of the pinstrip holder 46 are exposed and ready to receive the bill sheets.

To attach the bill sheets B upon the pins 50 the bills are placed upon the tapered portions 22 of the base 21 as shown in dotted lines in Figs. 2, 3 and in solid lines in Fig. 7, then the upper end B' of the bill sheets B are shoved against the angle bar 32 of the shutter 29 to assure correct alignment of the bill sheets upon the device.

This done, the operator hinges the pinning bar 38 in the direction indicated by the arrow C until the pinning bar 38 reaches the position as shown in Fig. 8.

It can be seen that the shutter 29 is attached to the segment-shaped plates 30 and 31 which in turn are attached to the segment gears 43. Also the pinning bar 38 is attached to the U-shaped frames 33 and 34 which have a pair of segment gears 45 attached thereto and which are in mesh with the segment gears 43.

When the pinning bar 38 is hinged in the direction shown by the arrow C, the shutter 29 is hinged in the opposite direction indicated by the arrow D and exposes the pins 50 of the pinstrip 46 allowing the bill sheets B to be pressed upon the pins 50.

This operation is repeated every time a new bill sheet is pinned upon the pinstrip holder 46 until it has filled up its desired length. Then it is removed and a new pinstrip holder is placed upon the device.

To protect the operator from injuring himself from the pins 50 the shutter 29 is always held in position over the pinstrip holder 46 when the L-shaped bar 48 is held open as shown in Fig. 8.

The pinstrip holder 46 cannot be removed from the device until the L-shaped bar 48 is in its original closed position as shown in Figs. 2 and 3 and covering the pins 50 by its inverted U-shaped portion 51. In this position, the locking arm 57 engages the pin 61 which is attached to the frame 33 of the pinning bar 38 within the groove 60 and locks the device in the position as shown in Fig. 7, leaving enough space in between the lower part of the shutter 29 and the pinstrip 46 to facilitate the easy removal of the pinstrip from the studs 49. When a new pinstrip is placed upon the device and the L-shaped bar 48 is hinged backwards, it will engage the downwardly extending portion 59 of the arm 57 and move it in the direction indicated by the arrow E. This action will disengage the pin 61 from the groove 60 to unlock the device for further operation.

Figs. 10 to 15 illustrate a removable summary or aligning board to be used in conjunction with the bill sheet pinning device shown in Figs. 1 to 9.

The aligning board is used in cases where it is necessary to align a number of bill sheets at the same time in series. The bills for that purpose are placed in staggering formation one upon the other as shown in Fig. 9, their lower edges resting against the aligning ruler 89. The ruler 89 is arranged to slide upon the table top 64 of the aligning board.

When it is required to adjust the position of the ruler 89 the knobs 69a are used. The knobs 69a turn the operating shaft 69 which in turn rotates the shaft 72 through the sprockets 92 and the link chains 90 and 91.

The ends 94 and 95 of the chains 90 and 91 are attached to the connecting bar 86 which connects both angle members 84 and 85 together. The ruler 69 has apertures on either end and is attached to the studs 88 which are located upon the angle members 84 and 85.

When it is necessary to move the ruler 69 fast upon the aligning board, the knobs 69a are dispensed with and the ruler 69 is slid by hand. To remove the pressure of the springs 77 from the chains 90 and 91, the handles 81 are turned clockwise. This operation will rotate the U-shaped portions 78 of the tension shafts 79 and allow the spring tension of the springs 77 to slacken. After the ruler 69 is removed from its position and is moved, the handles 81 are rotated back in their original position and the knobs 62a are used for finer ruler adjustment.

Having described my invention what I claim is:

1. A device for attaching sheets of paper upon the pins of a pinstrip holder, said pins arranged upon said holder in upright position and in fixed relation to each other, pressure bar means included for impaling said sheets of paper against said pins, and shutter safety plate means for covering said pins when said pressure means is operated; gear means also included upon said pressure bar means and in mesh with gear means included upon said safety plate means, said pressure means and said safety means being each hingedly supported upon said device, the manual hinging of said pressure bar means in an anticlockwise direction imparting a hinging motion to said safety shutter means in a clockwise direction.

2. A device for pinning paper sheets or the like including a base for holding a pinstrip holder, means included in said base for pinning said paper upon said pinstrip holder, said pinning means including a manually operated pinning bar, the operation of said bar impaling said paper upon said pinstrip holder, and means also included for covering said pinstrip holder when said holder is in inaccessible position; said means for covering said holder comprising an elongated shield, gear means included upon said pinning bar and being in mesh with gear means included upon said covering means, the manual operation of said pinning bar operating said covering means.

3. A device for securing paper sheets or the like in stepped relation upon a pinstrip holder, said pinstrip holder being removably supported upon a base included in said device, pressure means included in said device and being hingedly supported thereto, shutter means also being included in said device; gear means included upon said pressure means and being in mesh with gear means included upon said shutter means, said shutter means being hingedly movable when said pressure means is manually operated, said shutter means covering said pinstrip holder when said holder is in inaccessible position.

4. A device for securing sheets of paper or the like upon a pinstrip holder including a strip carrying spaced pins, a holder therefor, means for attaching said sheets of paper upon the pins of said holder and means for covering said pins of said pinstrip holder when said holder is in inaccessible position, said attaching means including a hingedly supported elongated pressure bar, the hinging motion of said bar upon the paper sheets impaling said sheets upon the pins of said pinstrip holder; said covering means including a hingedly supported shutter plate for covering the pins of said pinstrip; and having gear means being in mesh with gear means included and attached to said attaching means, said attaching means operating simultaneously and in timed relation with the covering means aforesaid.

5. A device for attaching bills, receipts and the like upon a pinstrip holder, comprising a base, a series of pins, said pinstrip holder being removably attached to said base, pressure bar means included for pinning said bills upon the pins of said holder and safety shutter means for protecting the operator from the pins of said holder when said device is in operation; said pressure bar means having apertures thereto for clearing said pins, said bar being hingedly mounted upon said base; said safety shutter means also being hingedly attached to said base; and gear means included upon said pressure bar means and said safety shutter means and being in mesh for operating said pressure and safety means in a fan wise motion and away from each other.

6. A means for attaching sheets of paper upon a pinstrip holder including shutter means for covering said holder, said attaching means and said shutter means being hingedly attached upon a frame; gear means included in said attaching means and being in mesh with gears included in said shutter means; the hinging of said attaching means in anticlockwise direction activating said covering shutter means in a clockwise direction.

7. A device for attaching sheets of paper upon a pinstrip holder, comprising a base, a series of pins, a pinstrip holder removably supported upon said base, said device including a perforated bar for facilitating the attaching of said paper to said pinstrip holder and a shutter plate for covering the pins of said pinstrip holder when said device is being operated; gear means included upon said perforated bar and being in mesh with gear means included upon said shutter plate, said perforated bar and said shutter plate being hingedly attached upon said base, the operation of said perforated bar transmitting a hinging motion to said shutter plate, said shutter plate clearing the tops of the pins of said pinstrip holder when it is desired to attach sheets of paper upon said pins, and said shutter plate covering again said pins of said holder when said holder is in inaccessible position.

8. A device for attaching sheets of paper in staggered formation upon a pinstrip holder, comprising a base, a series of pins, a pinstrip holder removably supported upon said base, manually activated attaching means included for attaching said paper to the pins of said pinstrip holder and automatically activated shutter safety means for covering said pins of said pinstrip holder when said holder is in inaccessible position, said attaching means including an elongated perforated bar being hingedly supported from both ends thereof upon a frame included in said base, said shutter safety means comprising an elongated shutter plate also being hingedly supported upon said frame; gear means included upon said hingedly supported attaching means and located at the hinging portion thereof, said gear means being in mesh with gear means included upon said safety shutter plate and located at the hinging portion thereof, the hinging of said attaching means in an anticlockwise direction activating said safety shutter means in a clockwise direction, said safety shutter means permanently covering the pins of said pinstrip holder when said holder is in inaccessible position.

9. The same structure as set in claim 8—and locking means included in said device for locking said attaching means in an inoperative position when said pinstrip holder is being removed from said device, said locking means including a hingedly supported arm, said arm hinging upon the base included in said device and having a grooved portion thereon, said grooved portion engaging a pin, said pin being attached upon said attaching means; said pin disengaging said groove when said pinstrip holder is placed upon said device for the purpose of attaching sheets of paper thereon, and said pin engaging said groove when said pinstrip holder is removed from said device, said pin holding said paper sheet attaching means in inoperative position when said holder is in operative position.

10. A device for attaching sheets of paper in an elongated and staggered formation upon the pins of a pinstrip holder, comprising a base, a series of pins, a pinstrip holder removably attached to said base, an elongated bar also included having a row of apertures thereon and being hingedly held at both ends to a pair of frame members attached to said base, said bar being manually operated in a hinging motion when attaching said sheets to the pins of said pinstrip holder; a safety shutter plate also included and being hingedly supported upon said frames, gears being attached to the hinging portions of said elongated bar and being in mesh with gears located upon the hinging portions of said safety shutter plate; the manual operation of said elongated bar transmitting a hinging motion to said safety shutter plate, said shutter plate exposing said pins of said pinstrip holder when it is desired to attach sheets of paper thereon and covering said pins when said holder is in an inaccessible position.

11. A paper attaching means including a pinstrip holder and a base having a pair of upright positioned frames, means included for attaching to said base the pinstrip holder, hinged means for facilitating the attaching of paper to said pinstrip holder and hinged means for covering said pinstrip holder when said paper attaching means is in inoperative position, said attaching means and said covering means being hingedly supported to said upright frames, and means included for operating said attaching means and said covering means in a hinging motion and away from each other.

12. A device for attaching sheets of paper upon a pinstrip comprising a base, a series of pins, a pinstrip removably supported on said base, means to facilitate the attaching of said paper upon said pins and means for guarding the operator from being injured by said pins; said attaching means including a hinged elongated bar having apertures thereon for clearing the top of said pins, said guarding means including an elongated shutter plate hinged substantially in the same position with said elongated bar, gears attached to the hinging portion of said attaching means and being in mesh with gears attached to the hinging portion of said guarding means, the operation in a hinging motion upon said attaching means transmitting a hinging motion to said guard means, said guarding means exposing the tops of said pins when said attaching means is depressed and covering said tops when the pressure is released from the attaching means aforesaid.

JOSEPH ZALKIND.